United States Patent [19]

Schessl

[11] 4,155,429
[45] May 22, 1979

[54] ADJUSTABLE WHEEL CHOCK ASSEMBLY

[76] Inventor: Ronald G. Schessl, P.O. Box 1593, Edmond, Okla. 73034

[21] Appl. No.: 875,312

[22] Filed: Feb. 6, 1978

[51] Int. Cl.$^2$ .............................................. B60T 3/00
[52] U.S. Cl. ................................................... 188/32
[58] Field of Search .......................... 188/32, 4 R, 2 R

[56] References Cited

U.S. PATENT DOCUMENTS

| | | | |
|---|---|---|---|
| 472,997 | 4/1892 | Hayward | 188/32 |
| 2,773,564 | 12/1956 | Garard | 188/32 |
| 3,305,050 | 2/1967 | Newberry | 188/32 |
| 3,317,006 | 5/1967 | Patterson | 188/32 |
| 3,661,229 | 5/1972 | Stonhaus | 188/32 |

FOREIGN PATENT DOCUMENTS

| | | | |
|---|---|---|---|
| 806297 | 6/1951 | Fed. Rep. of Germany | 188/32 |
| 654248 | 11/1928 | France | 188/32 |

*Primary Examiner*—Duane A. Reger
*Attorney, Agent, or Firm*—Laney, Dougherty, Hessin & Beavers

[57] ABSTRACT

An adjustable wheel chock assembly is provided which comprises a pair of reversible wheel chocks slidingly mounted upon a spacer bar assembly. The wheel chocks may be oriented in any one of four positions. In a first position, the chocks are oriented to engage adjacent sides of each of a pair of spaced aligned wheels mounted upon parallel axles. In a second position the chocks are oriented to engage opposite sides of a single wheel. In a third position the chocks are oriented to engage opposite sides of each of a pair of spaced aligned wheels mounted upon parallel axles. In a fourth position the chocks are oriented to engage alternate sides of a pair of spaced aligned wheels mounted upon parallel axles. The chock assembly is of a lightweight but very strong construction, being made from a heavy gauge perforated steel plate. The reversible chocks are of a symmetric design so that one of said chocks may be inverted so as to mate with the other chock, the combination of said chocks in this configuration comprising a rectangular parallelepiped which may be conveniently packaged for shipping or storage.

9 Claims, 9 Drawing Figures

ADJUSTABLE WHEEL CHOCK ASSEMBLY

BACKGROUND OF THE INVENTION

1. Field of the Invention

This invention relates generally to adjustable wheel chock assemblies for providing a lateral support beneath wheels of automobiles, trucks and the like to prevent a vehicle from rolling away from a stationary position.

2. Description of the Prior Art

The prior art includes several variations upon an adjustable chock assembly, the most pertinent of which are:

| U.S. Pat. No. | | |
|---|---|---|
| | 2,418,279 | Sax et al. |
| | 2,442,023 | Schwarzhoff |
| | 2,461,248 | Wright |
| | 2,522,328 | Wiswell et al. |
| | 2,773,564 | Garard, Sr. |
| | 2,998,102 | Deverich |

The above references show that although numerous variations upon adjustable chock assemblies are present in the prior art, there is no existing system combining all the novel features of the present invention. The present invention provides a lightweight, structurally sound, economically manufactured, reversible and invertible chock assembly which may be used to provide a single chock on adjacent sides of a pair of wheels mounted upon spaced parallel axles, a double chock on either side of a single wheel, single chocks on opposite sides of a pair of wheels, and single chocks on alternate sides of a pair of wheels.

Also, in its inverted position, the chock assembly of the present invention conforms to a spatially efficient, parallelepiped configuration allowing for simple, economical storage and shipping of the wheel chock assembly.

SUMMARY OF THE INVENTION

An adjustable wheel chock assembly is provided which comprises a pair of reversible wheel chocks slidingly mounted upon a spacer bar assembly. The wheel chocks may be oriented in any one of four positions. In a first position, the chocks are oriented to engage adjacent sides of each of a pair of spaced aligned wheels mounted upon parallel axles. In a second position the chocks are oriented to engage opposite sides of a single wheel. In a third position the chocks are oriented to engage opposite sides of each of a pair of spaced aligned wheels mounted upon parallel axles. In a fourth position the chocks are oriented to engage alternate sides of a pair of spaced aligned wheels mounted upon parallel axles. The chock assembly is of a lightweight but very strong construction, being made from heavy gauge perforated steel plate. The reversible chocks are of a symmetric design so that one of said chocks may be inverted so as to mate with the other chock, the combination of said chocks in this configuration comprising a rectangular parallelepiped which may be conveniently packaged for shipping or storage.

It is therefore a general object of the present invention to provide an adjustable wheel chock assembly for the anchoring of rolling vehicles.

Another object of the present invention is to provide a wheel chock assembly which in a first position provides a single chock under adjacent sides of a pair of wheels mounted upon spaced parallel axles.

A further object of the present invention is to provide a wheel chock assembly which in a second position may be used to provide a double chock on either side of a single wheel.

And a further object of the present invention is to provide an adjustable wheel chock assembly which in a third position comprises chocks engaging opposite sides of a pair of spaced wheels.

Yet a further object of the present invention is to provide a wheel chock assembly which in a fourth position provides chocks engaging alternate sides of each of a pair of spaced aligned wheels.

And a further object of the present invention is to provide a wheel chock assembly which in a fifth position comprises a rectangular parallelepiped configuration for easy storage and shipping.

Yet another object of the present invention is the provision of an improved adjustable wheel chock assembly being constructed of a lightweight yet structurally sound perforated steel plate material.

Yet a further object of the present invention is the provision of an adjustable wheel chock assembly having safety reflector means mounted thereon.

Yet another object of the present invention is the provision of an adjustable wheel chock assembly having a plurality of spacer bars therebetween to allow for expansion of the assembly.

Other and further objects, features and advantages of the present invention will be readily apparent to those skilled in the art upon a reading of the description of preferred embodiments which follows when taken in conjunction with the accompanying drawings.

DETAILED DESCRIPTION OF THE PREFERRED EMBODIMENTS OF THE INVENTION

Figure 1:
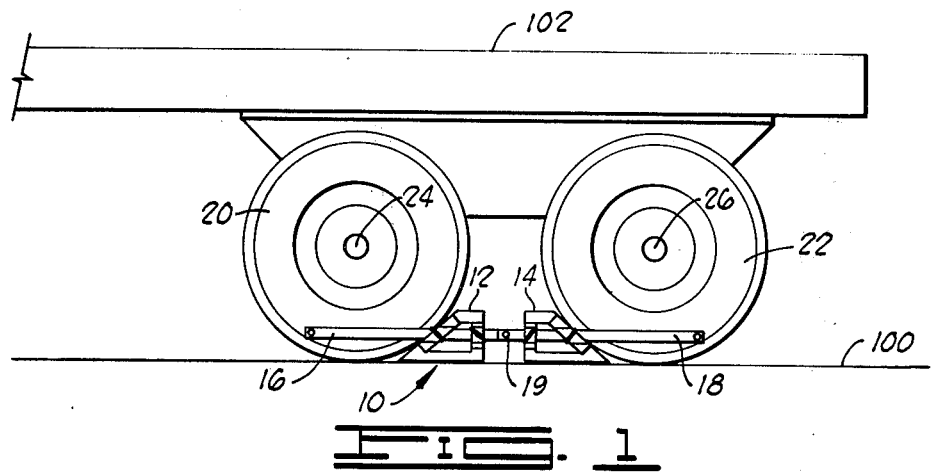
FIG. 1 is an elevation view of the adjustable wheel chock assembly in a first position providing a single chock under adjacent sides of each of a pair of aligned wheels mounted upon spaced parallel axles.

Referring now to the drawings and particularly to FIG. 1, the adjustable wheel chock assembly of the present invention is illustrated and generally designated by the numeral 10. The adjustable chock assembly 10 includes a pair of chocks 12 and 14 and first and second spacer bars 16 and 18. Spacer bars 16 and 18 are connected by a bolt 19.

In FIG. 1, the chock assembly 10 is shown in a first position providing a single chock beneath adjacent sides of each of a pair of aligned wheels 20 and 22 mounted upon spaced parallel axles 24 and 26, the tapered ends of said chocks facing away from each other.

Figure 2:
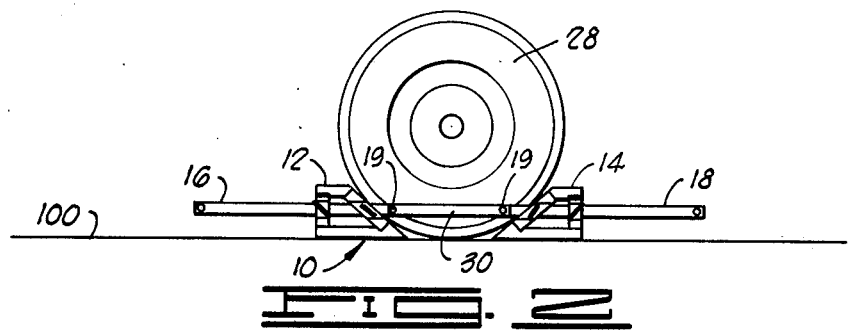
FIG. 2 is an elevation view of the adjustable wheel chock assembly in a second position providing a double chock, one under each of the opposite sides of a single wheel.

Referring to FIG. 2, the adjustable chock assembly 10 is shown in a second position so that the chocks 12 and 14 provide a double chock, one on each of the opposite sides of a single wheel 28, the tapered ends of said chocks facing toward each other. To provide the required spacing between the chocks 12 and 14, a third intermediate spacer bar 30 is provided and is attached to each of the spacer bars 16 and 18 by bolts 19.

Figure 7:
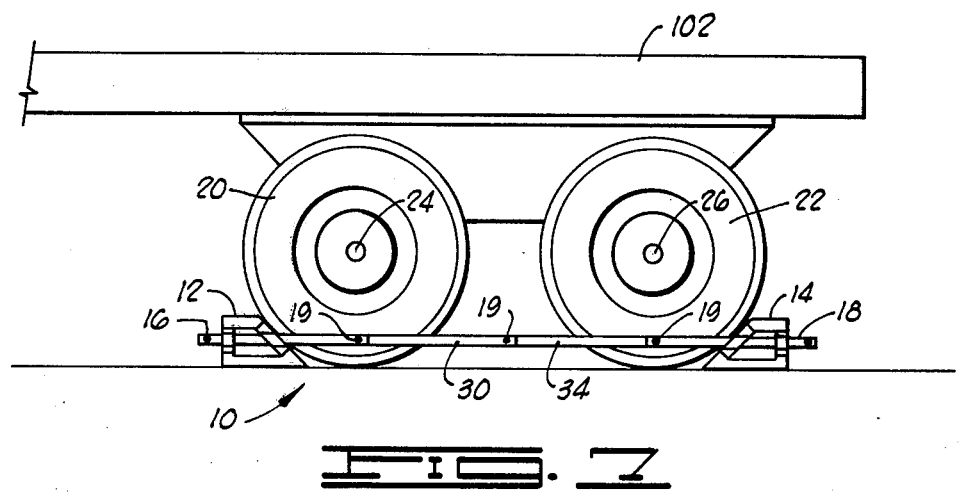
FIG. 7 is a side elevation view of the adjustable chock assembly of the present invention in a third position providing a single chock under opposite sides of each of a pair of aligned wheels mounted upon spaced parallel axles.

Referring to FIG. 7, the adjustable chock assembly of the present invention is shown in a third position providing a single chock beneath opposite sides of each of the pair of aligned wheels 20 and 22 mounted upon spaced parallel axles 24 and 26. To provide the additional spacing required between the chocks 12 and 14, a fourth spacer bar 34 is provided between the spacer bar 30 and the spacer bar 18.

Figure 8:
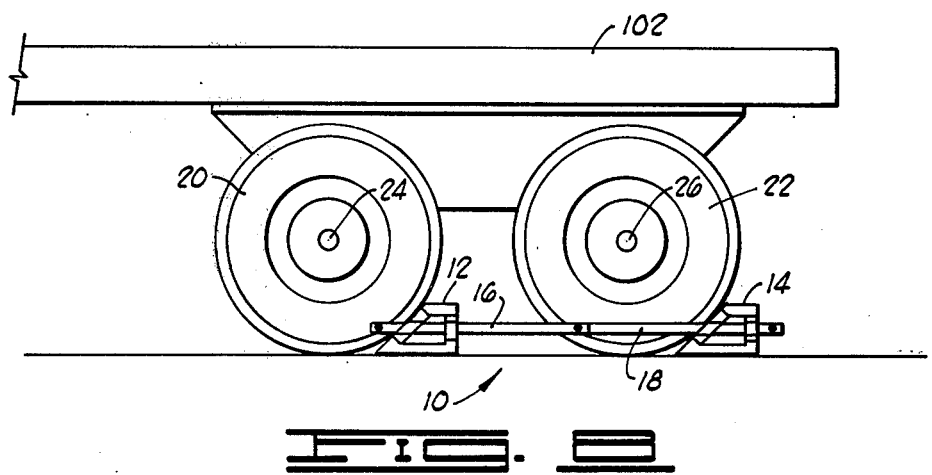
FIG. 8 is a side elevation view of the adjustable wheel chock assembly of the present invention oriented in a fourth position providing a single chock under alternate sides of each of a pair of spaced wheels.

In FIG. 8, the adjustable wheel chock assembly 10 is shown in a fourth position providing chocks 12 and 14 beneath alternate sides of each of a pair of spaced aligned wheels 20 and 22, the tapered ends of said chocks each being directed in the same direction.

Figure 9:
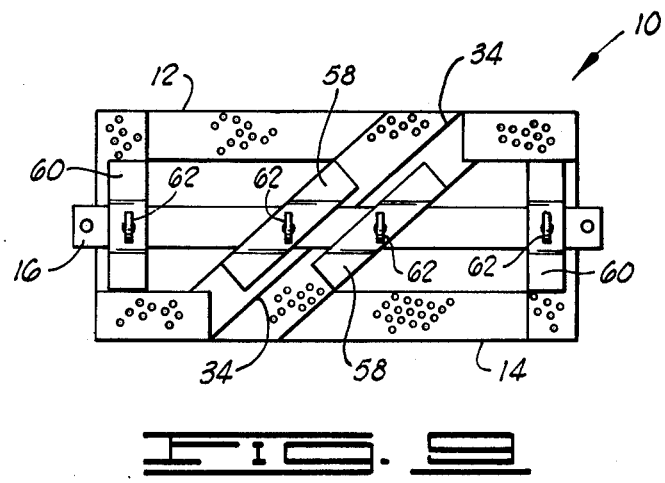
FIG. 9 is a side elevation view of the wheel chock assembly in an inverted storage position providing a spatially efficient parallelepiped configuration.

Referring to FIG. 9, the adjustable chock assembly 10 is shown in a fifth position. In this position, the adjustable chock assembly substantially conforms to a rectangular parallelepiped configuration thereby providing for a spatially efficient storage and shipping of the same. To achieve the rectangular parallelepiped configuration, the first chock 12 is inverted and is positioned with its sloping face co-extensive with the sloping face of the second chock 14 so that the two chocks combine to form a rectangular parallelepiped. The chocks are held in position by engagment with the spacer bar 16.

Figures 3, 4:
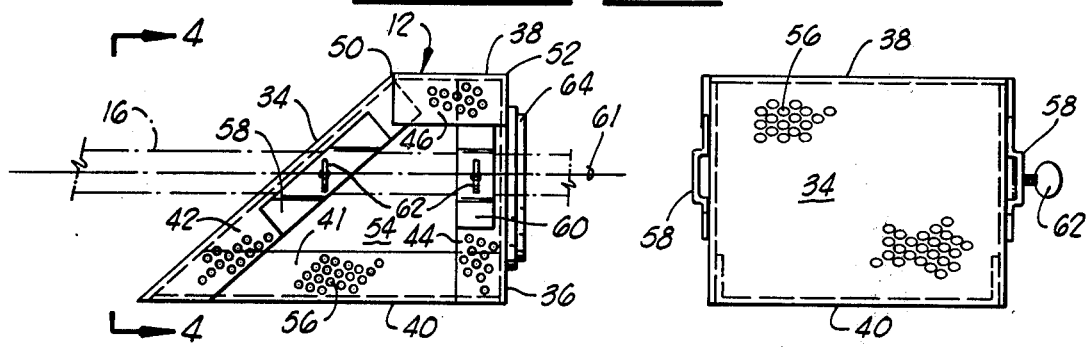
FIG. 3 is a side elevation view of one of the chocks of the adjustable chock assembly.
FIG. 4 is a front elevation view of the chock of FIG. 3 as viewed from the lines 4—4.
Figure 5:
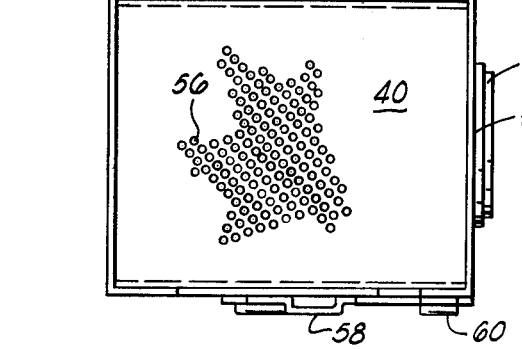
FIG. 5 is a bottom view of the chock of FIG. 3.

In FIG. 3, an enlarged side elevation view of the first chock 12 of FIG. 1 is shown. The following description of the chock 12 also applies to the chock 14. The chock 12 has a sloped front end surface 34, a vertical rear end surface 36, and horizontal upper surface 38 and a horizontal lower surface 40.

The construction of the chock 12 may be described as follows. A continuous rectangular surface having three extending tabs 42, 44 and 46 extending from each of two parallel sides is cut from a flat perforated steel plate. Imaginary lines (as defined by the points 50 and 52) divide the rectangular surface into three portions 34, 36 and 38. An outer corner is trimmed from each of the tabs 42. The rectangular surface is bent about the imaginary lines separating adjacent tabs so as to form a central horizontal upper surface 38 with a rear end surface 36 depending vertically downward from one end and a tapered front surface 34 depending at an obtuse angle from the other end of the upper surface 38. A bottom planar rectangular surface 40 is formed having a vertically upwardly extending tab 41 depending substantially perpendicularly from two opposite sides thereof, said tabs 41 having a sloped front end. The tabs 42 and 44 of the front and rear surfaces 34 and 36 are bent inwardly to overlap the upwardly extending tabs 41 of the bottom surface 40. The tabs 46 of the central upper surface 38 are bent inwardly to overlap the tabs 42 and 44. Finally, the tabs 41, 42, 44 and 46 are fixedly connected, one to the other, at points where said tabs overlap.

Preferably the chock 12 is constructed from heavy gauge perforated steel plate. The connections between overlapping tabs are preferably made by spot welding.

As is shown in FIG. 3, this method of construction creates a chock 12 having the planar bottom surface 40, the rear end 36 depending substantially perpendicularly upward from the bottom surface 40, and a tapered front wheel engaging end 34 depending from the bottom surface 40 at an acute angle. The side of the chock 12 defines a truncated right triangle having an open space 54, therein, of similar shape. By means of the construction just described, including the open spaces 54 and the use of perforated steel plate having a plurality of perforations 56, a chock is provided which is structurally sufficient to withstand the abuse present when used with large vehicles such as semi-trailer trucks and at the same time is very lightweight and of economical construction.

The unitized construction of the surfaces 34, 36 and 38 provides additional structural integrity in that a large portion of the load from the wheel 20 is transferred directly to the ground surface 100, upon which the wheel 20 rests, without being carried by any structural connection, such as a weld, which might fail under excessive load. This is particularly important in those unusual situations where the wheel accidentally might be driven onto the upper surface 38 of the chock 12.

A further safety feature is provided by the multiple perforations 56 in the front surface 34, as is seen in FIG. 4. These perforations provide an increased frictional engagement with the polymeric surface of the wheel 20 which tends to extrude into the perforations thereby gripping the surface 34 much more effectively than would be the case absent the perforations 56.

Figure 6:
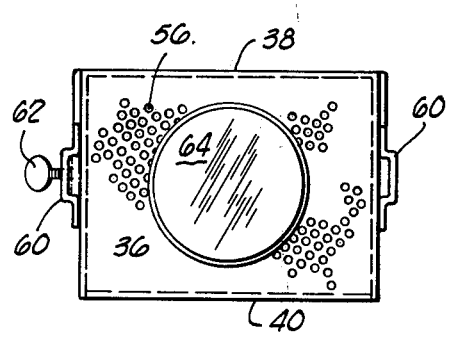
FIG. 6 is a rear elevation view of the chock of FIG. 3.

The chock 12 further comprises front and rear spacer bar guides 58 and 60 respectively, attached to each of the tabs 42 and 44, respectively. Each of the spacer bar guides is attached to its corresponding tab by spot welding. As is best seen in FIGS. 4 and 6, the spacer bar guides 58 and 60 comprise a U-shaped strap providing a slot within which the spacer bar 16 (shown in phantom lines in FIG. 3) is closely received. Furthermore, each of the spacer bar guides 58 and 60 includes thumb screws 62 which threadedly engage holes in the spacer bar guides. The spacer bars are retained within the spacer bar guides by screwing the thumb screws 62 inwardly thereby clamping the spacer bars between the thumb screws 62 of the tabs 42 and 44.

In a preferred embodiment, the spacer bar guides 58 and 60 are so located as to receive the spacer bars at a position parallel to the bottom surface 40, and with a central longitudinal axis 61 of the spacer bar 16 spaced from the bottom surface 40 a distance substantially equal to one-half the height of the rear end surface 36. This allows the chock 12 to be oriented in the inverted position shown in FIG. 9, and the spacer bar guides 58 and 60 of the chock 12 to still be aligned with the spacer bar guides 58 and 60 of the chock 14, so that the spacer bar 16 may be received in said spacer bar guides of both chocks to retain the chocks in the parallelepiped configuration of FIG. 8. It will be appreciated that a slight offset of the positioning of the spacer bar guides 58 and 60, i.e., a positioning such that the axis 61 is spaced from the bottom surface 40 a distance slightly more than one-half the height of the rear end surface 36, will prevent the assembly of FIG. 9 from having exactly a rectangular parallelepiped shape if the surfaces 34 engage each other. If, however, the surfaces 34 are slightly spaced from each other, then the chock assembly 10, when oriented in the manner shown in FIG. 9, will still conform to the substantial equivalent of a rectangular parallelepiped configuration.

The provision of spacer bar guides 58 and 60 on each side of each chock provides a reversible chock assembly which permits quick and easy orientation of the chocks to achieve any of the five possible positions previously described. For example, if the chock assembly 10 is in that orientation shown in FIG. 1, and it is desired to change it to the orientation of FIG. 8, the chock 14 may be removed from the spacer bar 18, rotated 180° about a vertical axis, and remounted upon the spacer bar 18 using the spacer bar guides 58 and 60 on the opposite side of the chock 14 from the spacer bar guides 58 and 60 which were originally used in the position of FIG. 1.

The chock 12 also includes a safety reflector 64 which is mounted upon the rear end surface 36. The safety reflector 64 is of conventional design as is known to those skilled in the art.

OPERATION

The adjustable chock assembly 10 of the present invention may be used in any one of four positions as shown by FIGS. 1, 2, 7 and 8, and may be stored and transported in a fifth position shown in FIG. 9. The one of the first four positions to be used in a given application depends upon the configuration of the wheels of the vehicle involved. As will be understood by those skilled in the art, it is desirable that a chock, which is being used to prevent lateral motion of a wheel upon a surface, be somehow affixed relative to the surface. This can be done either by attaching the chock to the surface 100 or by attaching the chock to a second object such as a second chock so that neither the first or the second chock can move relative to the surface without the movement of the attached chock. This may be done by placing each of the chocks about a single wheel or about each of a pair of wheels.

If the adjustable chock assembly 10 is used to chock the wheels of a vehicle such as a semi-trailer having a pair of spaced parallel axles, then the safest manner for chocking the wheels on relatively level ground is either that shown in FIG. 1 or FIG. 7. The position of the adjustable chock assembly 10 illustrated by FIG. 7 has the additional safety feature that the rear ends 36 of the chocks 12 and 14 with their accompanying safety reflectors 64 are visible from either end of the chock assembly and serve to warn passing motorists of the presence of the immobilized vehicle 102.

In situations where the double axled vehicle is parked upon an incline it may be preferable to use the orientation of FIG. 8, with the chocks 12 and 14 placed on the downhill side of the wheels 20 and 22, respectively.

If the vehicle to be chocked is a vehicle such as an automobile having only a single axle at either end of the vehicle, then the appropriate method for chocking the wheels is that illustrated in FIG. 2. The chocks 12 and 14 are snugly wedged between the wheels 28 and the surface 100 and then are securely connected by means of the spacer bars 16, 18 and 30 which are firmly clamped to the chocks by means of the thumb screws 62.

When it is desired to store the chock assembly 10 or when the chock assembly 10 is initially packaged for shipping to the location of sale, the chock assembly 10 is preferably oriented in the configuration illustrated in FIG. 9. There the first chock is placed in an inverted position so that its front end 34 is parallel to, engaging and co-extensive with the front end 34 of the second chock 14. To hold the chock assembly in this position, the spacer bar 16 is inserted in the spacer bar guides 58 and 60 and clamped by means of the thumb screws 62. In this manner, the chock assembly 10 is held in a rectangular parallelepiped configuration which may be conveniently packed in a similarly shaped, slightly larger corrugated cardboard container. Preferably, each of the spacer bars 16, 18, 30 and 34 are of such length to only be slightly longer than the longest edge dimension of the rectangular parallelepiped defined by the configuration shown in FIG. 8. This allows the spacer bars to be easily fitted within the same shipping container in which the chocks 12 and 14 are shipped.

Thus, the adjustable chock assembly of the present invention is well adapted to carry out the objects and attain the ends and advantages mentioned as well as those inherent therein. While presently preferred embodiments of the invention have been described for the purpose of this disclosure, numerous changes in the construction and arrangement of parts can be made by those skilled in the art, which changes are encompassed within the spirit of this invention as defined by the appended claims.

What is claimed is:

1. An adjustable wheel chock assembly comprising:
    a pair of chocks, each chock having a bottom surface, a rear end surface depending substantially perpendicularly from the bottom surface, and a tapered front end surface depending from the bottom surface at an acute angle, said chocks being so constructed that when one chock is inverted and placed with its tapered end adjacent the tapered end of the other chock, the two chocks form a substantially rectangular parallelepiped;
    spacer bar means for connecting the chocks;
    spacer bar guide means attached to each chock, so positioned as to receive said spacer bar means at a position parallel to the bottom surface and with a central longitudinal axis of the spacer bar means spaced from the bottom surface a distance substantially equal to one-half the height of said rear surface, each of said guide means including first and second U-shaped straps, attached to opposite sides of each of said chocks, for receiving said spacer bar means in slots defined by one of said U-shaped straps of each chock and the side of the respective chock;
    a thumb screw threadedly engaging each U-shaped strap for clamping said spacer bar means between the side of the chock and the thumb screw; and
    said guide means and spacer bar means being so constructed that said spacer bar means may be removed from engagement with the U-shaped strap on one side of one of said chocks and said one chock may be rotated 180° about a vertical axis and re-engaged with said spacer bar means so that said spacer bar means is received in the slot of the U-shaped strap on the opposite side of said one chock.

2. The adjustable wheel chock assembly of claim 1 further characterized as being constructed so that said tapered front ends of said chocks face away from each other, for engaging adjacent sides of each of a pair of wheels mounted upon a pair of spaced parallel axles.

3. The adjustable wheel chock assembly of claim 1 wherein said chocks are attached to said spacer bar means with said tapered ends facing toward each other for engaging opposite sides of a single wheel.

4. The adjustable wheel chock assembly of claim 1 wherein:
said spacer bar means further comprises first and second spacer bars engaging said first and second chocks, respectively, and a third spacer bar connected to each of said first and second spacer bars; and
said chocks are attached to said first and second spacer bars with said tapered ends facing towards each other for engaging opposite sides of each of a pair of aligned wheels mounted upon spaced substantially parallel axles.

5. The adjustable wheel chock assembly of claim 1 wherein said chocks are oriented with the tapered front ends directed in the same direction for engagement with alternate sides of a pair of spaced aligned wheels mounted upon substantially parallel spaced axles.

6. The adjustable wheel chock assembly of claim 1 further comprising a safety reflector attached to each of said rear ends.

7. The adjustable wheel chock assembly of claim 1 wherein said tapered front end is further comprised of a surface having multiple perforations for providing increased frictional engagement with a wheel.

8. Apparatus of claim 1, wherein:
said sides of said chocks comprise the shape of a truncated right triangle and have openings therein which also comprise the shape of a truncated right triangle.

9. Apparatus of claim 8, wherein:
said front and rear end surfaces and a central upper horizontal surface of each of said chocks comprise a continuous rectangular surface having three extending tabs from each of two parallel sides of said surface, with imaginary lines between said tabs dividing said rectangular surface into three portions, an outer corner from the tab on each side of one end of the rectangular surface being trimmed, said rectangular surface being bent about said imaginary lines so as to form said central horizontal upper surface with said rear end surface depending vertically downward from one end of said upper surface and said tapered front end surface depending at an obtuse angle from the other end of the upper surface; and
said bottom surface includes a tab extending from each of two parallel sides of said bottom surface, said tabs of said bottom surface having a sloped front end, all of said tabs of said upper, bottom, front and rear end surfaces being bent inwardly so as to extend substantially perpendicularly to their respective surfaces, said tabs overlapping to form said truncated right triangular shaped sides with said truncated right triangular openings therein.

* * * * *